US007797174B2

(12) United States Patent
Samuels

(10) Patent No.: US 7,797,174 B2
(45) Date of Patent: Sep. 14, 2010

(54) LIFE INSURANCE OPTION

(75) Inventor: Jonathan H. Samuels, Santa Barbara, CA (US)

(73) Assignee: Samuels Property Group LLC, Santa Barbara, CA (US)

( * ) Notice: Subject to any disclaimer, the term of this patent is extended or adjusted under 35 U.S.C. 154(b) by 1042 days.

(21) Appl. No.: 11/256,320

(22) Filed: Oct. 21, 2005

(65) Prior Publication Data
US 2007/0094053 A1    Apr. 26, 2007

(51) Int. Cl.
*G06Q 40/00* (2006.01)
(52) U.S. Cl. ......................................................... 705/4
(58) Field of Classification Search .................. 705/2–4
See application file for complete search history.

(56) References Cited

U.S. PATENT DOCUMENTS

| 4,839,804 | A |   | 6/1989 | Roberts et al. |        |
|-----------|---|---|--------|----------------|--------|
| 5,752,236 | A |   | 5/1998 | Sexton et al.  |        |
| 6,163,770 | A | * | 12/2000| Gamble et al. .................. | 705/4 |
| 6,263,321 | B1| * | 7/2001 | Daughtery, III ........... | 705/36 R |
| 6,456,979 | B1|   | 9/2002 | Flagg           |        |
| 7,370,000 | B2| * | 5/2008 | Sherman ........................ | 705/4 |
| 2001/0034619 | A1 | | 10/2001 | Sherman |        |
| 2001/0049612 | A1 | | 12/2001 | Davis |        |
| 2002/0143583 | A1 | | 10/2002 | Reader et al. |        |
| 2002/0156657 | A1 | | 10/2002 | de Grosz et al. |    |
| 2002/0165740 | A1 | | 11/2002 | Saunders |        |
| 2002/0173995 | A1 | | 11/2002 | Schiminovich |    |
| 2004/0103012 | A1 | | 5/2004 | Nussbaum et al. |    |
| 2004/0148202 | A1 | | 7/2004 | Siefe et al. |        |
| 2004/0236612 | A1| * | 11/2004 | Heusinkveld et al. .......... | 705/4 |
| 2006/0271413 | A1| * | 11/2006 | Smith ........................... | 705/4 |

OTHER PUBLICATIONS

Edward E. Graves, Editor, "McGill's Life Insurance," Chapter 22, p. 456 (1994).*
Northwestern Mutual Financial Network, Insurance Products [online], Dec. 30, 2004, 3 pgs., The Northwestern Mutual Life Insurance Company, Milwaukee, WI; located at: http://www.nmn.com/tn/insprods--life_list_pg.
International Search Report and Written Opinion dated Aug. 7, 2007, for PCT/US2006/040995.

* cited by examiner

*Primary Examiner*—Robert W Morgan
*Assistant Examiner*—Joy Chng
(74) *Attorney, Agent, or Firm*—Bingham McCutchen LLP

(57) ABSTRACT

A method of providing deferred life insurance through a life insurance option. The deferred life insurance becomes effective later in the life of an insured after the option matures. The insured pays at least one payment during a first period for the deferred life insurance policy option. The deferred life insurance policy is inactive during the first period, and becomes effective at the beginning of the second period when the option matures. The insured pays at least one payment during a second period, which follows the first period, for the deferred life insurance policy, assuming the insured lives this long. The insured is entitled to a benefit based on the deferred term life insurance policy only in the event of death of the insured occurs during the second period. Payments for the life insurance option can be made by a person who is the insured or on behalf of another person who is the insured, such as a child or other third party. The individual payments and sum of payments can be structured to suit the insured's financial objectives, while providing incoming funds to an insurance company. The deferred life insurance policy can be used in conjunction with a conventional life insurance policy, such as conventional term and whole life insurance policies.

38 Claims, 8 Drawing Sheets

LIFE INSURANCE OPTION

FIELD OF THE INVENTION

The present invention relates generally to life insurance policies, and more particularly, to a life insurance option that matures into a deferred life insurance policy later in life.

BACKGROUND

Various life insurance policies are known today, including permanent life insurance, such as whole life, universal life and variable universal life insurance, and term life insurance. Whole life insurance guarantees that a benefit will be paid by an insurance company, underwriter or other issuer (generally, "insurance company") to a beneficiary upon the death of the insured or policyholder (generally, the "insured"). With a whole life policy, a benefit is paid by the insurance company regardless of when death of the insured occurs. Whole life also allows the insured to accumulate cash value so that the insured can draw upon the cash value. Also, whole life policy premiums generally do not increase with age and, instead, are usually stable over time. Term life insurance, on the other hand, involves payment of a benefit to a beneficiary of an insured in the event of the insured's death during a specified period of time. For example, term policies are often prepared for periods of one to thirty years, e.g., one, ten, twenty, twenty-five and thirty years. Thus, a term life insurance policy is temporary and covers only a specified period of time, and builds no cash value.

For example, if an insured has a 25 year term life insurance policy, the insurance company would pay out the specified benefit to a beneficiary in the event of death of the insured during that 25 year term. However, in the event of death of the insured after expiration of the 25 year term, e.g., 25 years and six months, then no benefit would be paid. Term insurance policies are often desirable over whole life policies since they provide benefits at a lower cost compared to whole life insurance. However, a term life insurance policy holder who was fortunate to have outlived the term policy paid premiums to the insurance company without any benefit disbursement and no accrued cash value in exchange for this comfort of limited duration. Further, the insured is placed in a difficult position upon expiration of the term policy, particularly if the insured has no other life insurance policies in place. It may be difficult for a person to obtain a second policy after the first policy expires due to the health and age of the person after the term policy expires.

More particularly, the original term life insurance policy was likely acquired following an initial medical examination. The medical examination may not be an issue for the insured at that time, particularly when the insured is young and in good health. Over time, however, a person's health generally declines, and obtaining a second term policy (or a whole life policy) after expiration of an initial policy typically requires a second medical examination. The second medical examination will likely result in substantially higher premiums since the insurance company is assuming greater risk of death of the insured during the duration of the second term policy, particularly if the second policy is obtained substantially later in life, e.g., 20-30 years later.

Thus, a person is placed in the difficult position of obtaining a second policy at substantially higher premiums or, alternatively, declining to obtain a second policy. This is not a desirable situation, particularly for elderly persons, retired persons who may be on a fixed income, and persons who have developed various health conditions since the initial examination that was used to underwrite the initial insurance policy.

Accordingly, there exists a need for a life insurance policy option that matures as a deferred policy later in life, e.g., at the expiration of a conventional term life insurance policy. Such an option and deferred policy would provide persons with life insurance that would otherwise be unattainable or substantially more expensive if obtained later in life and, at the same time, provide additional premiums to an insurance company which may or may not be required to pay a benefit.

SUMMARY

In accordance with one embodiment is a method of providing deferred life insurance that becomes effective later in life. The method includes receiving at least one payment from an insured during a first period for an option of a deferred life insurance policy. The insured is not entitled to a benefit under the deferred life insurance policy in the event of death of the insured during the first period. The option matures into a deferred life insurance policy if the insured lives beyond the first period and into a second period. The deferred policy is effective at the beginning of the second period, and the insured is entitled to a benefit based on the deferred policy in the event of death of the insured during the second period.

In accordance with another embodiment is a method of providing deferred term life insurance that becomes effective later in life of an insured and that includes receiving at least one payment from an insured during a first period, which can be about one year to about forty years, for an option of a deferred term life insurance policy. The insured is not entitled to a benefit under the deferred policy in the event of death of the insured during the first period. The option matures into the deferred term life insurance policy if the insured lives beyond the first period and into a second period, which can be about one year to about forty years and which follows the first period. The deferred policy is effective at the beginning of the second period, and the insured is entitled to a benefit based on the deferred term life insurance policy in the event of death of the insured during the second period.

In accordance with yet another embodiment is a method of providing deferred term life insurance that becomes effective later in life that includes receiving at least one payment from an insured during a first period for an option of a deferred term life insurance policy, and receiving at least one payment from the insured during a second period. The first and second periods can be about one year to about forty years. The insured is not entitled to a benefit under the deferred term life insurance policy in the event of death of the insured during the first period. The option matures into the deferred term life insurance policy and is effective at the beginning of the second period if the insured lives beyond the first period and into a second period. The deferred policy is based on medical examination information of the insured prior to the first period. The insured is entitled to a benefit based on the deferred policy in the event of death of the insured during the second period.

According to another embodiment, an article of manufacture, such as magnetic and/or optical and other storage media, including a diskette, a Compact Disc (CD), a Digital Video Disc (DVD), or other program storage device readable by a computer or other processing device, embodies one or more programs of instructions executable by the computer to perform method steps for providing deferred life insurance that becomes effective later in life. The method includes receiving at least one payment from an insured during a first period for an option of a deferred life insurance policy. The insured is not entitled to a benefit under the deferred life insurance policy in the event of death of the insured during the first period, but if the insured lives beyond the first period and into a second period, an option matures into a deferred life insurance policy that is effective at the beginning of the second period. The insured is entitled to a benefit based on the deferred life insurance policy only in the event of death of the insured during the second period.

In various embodiments, the first and second periods can be various durations, e.g., about one to about forty years. Further, the duration of the second period can end on a predetermined date or with death of the insured.

Payments made during the first and second periods can be structured to suit various needs. For example, payments can be made during the first and/or second periods on a periodic or non-periodic basis. Depending on the lifespan of the insured, the insured may or may not live beyond the end of the first period and into the second period. Thus, the option may or may not mature, and the insured may or may not make one or more payments during the second period. The payment structure can also be weighted as needed. For example, the payment(s) made during the first period can be greater or less than the payment(s) made during the second period. Additionally, the sum of payment(s) made during the first period can be greater or less than the sum of payment(s) made during the second period.

The deferred life insurance policy can also be based on medical examination information of the insured obtained prior to the first period. Thus, an insured is not required to be subjected to a medical examination later in life when the health of the insured may not be as good as in earlier in life.

The option for a deferred life insurance policy can also be concurrent with another known or conventional policy. For example, according to one embodiment, payments can be made during the first period for a known life insurance policy, such as a known term life insurance policy, a known whole life insurance policy, or other known policies that suit the needs of the insured.

A conventional term life insurance policy can expire at the end of the first period so that the insured is covered under the known term life insurance policy during the first period, and covered under the deferred term life insurance policy during the second period (assuming the insured lives beyond the first period). Thus, if death of the insured occurs during the first period, then a benefit would be paid under the conventional term life insurance policy but not the deferred policy. If death of the insured occurs during the second period, then a benefit would be paid under the deferred policy, but not the conventional term life insurance policy. When the conventional policy is a whole life policy, then a benefit under the conventional whole life insurance policy can be paid in the event of death of the insured during the first or second periods, and a benefit under the deferred policy would also be paid if death occurs during the second period.

Other objects and features of embodiments will become apparent from consideration of the following description taken in conjunction with the accompanying drawings.

In the following description, reference is made to the accompanying drawings which form a part hereof, and which show by way of illustration specific embodiments. It is to be understood that changes may be made without departing from the scope of embodiments.

DETAILED DESCRIPTION OF ILLUSTRATED EMBODIMENTS

Embodiments of the invention provide a life insurance policy option that matures as a deferred life insurance policy, such as a term or whole life policy, that provides life insurance coverage in the future, e.g., after an initial life insurance policy expires, in exchange for payment of premiums during a first period before the option matures and during which time no benefit is payable. More specifically, the policy holder pays a premium during a first or inactive period. No benefit is paid by the insurance company in the event of death of the insured during the first period. If the insured lives beyond the expiration of the first period and into the second period, then the option matures into a deferred life insurance policy, which is effective as of the beginning of the second period. The insured continues to pay premiums during the second period according to the agreed upon schedule. An insurance company pays a benefit under the deferred life insurance policy only in the event of death of the insured during the second period, i.e., after the option matures. The deferred life insurance policy can be based on medical examination prior to the first period. Thus, the insured is not required to submit to a second medical examination later in life in order to obtain the deferred life insurance.

The life insurance structures according to embodiments of the invention provide comfort to the insured knowing that if the insured is fortunate to live beyond a certain date, e.g., an expiration date of an initial term life insurance policy, there will be another policy in place to provide benefits. Further, the option matures into a deferred life insurance policy without requiring the insured to undergo an additional medical examination. Accordingly, embodiments provide life insurance coverage later in life at premiums that are less than premiums of a second, separate policy that is obtained later in life. Further details of various embodiments are described below with reference to FIGS. 1-8.

Figure 1:
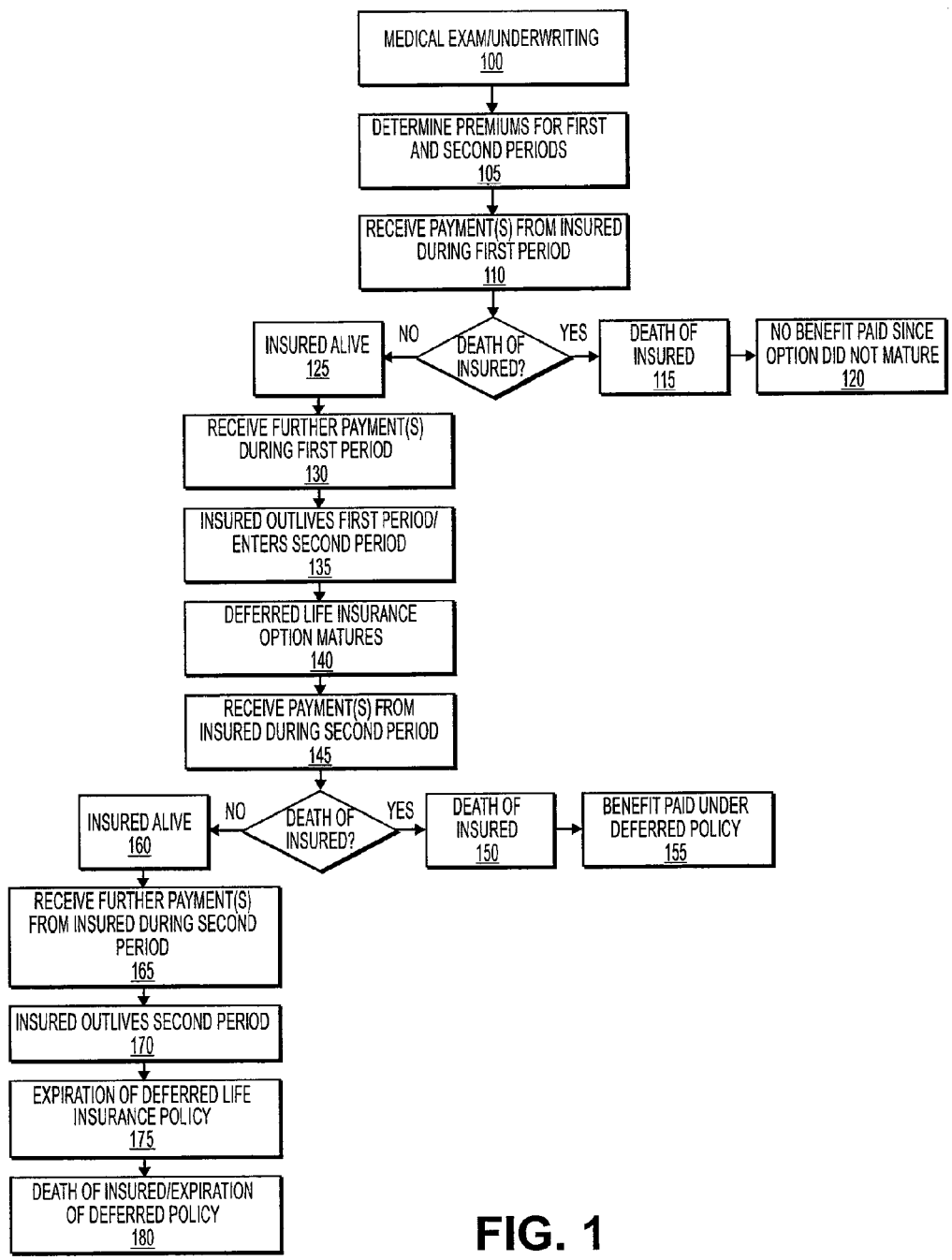
FIG. 1 is a flow chart generally illustrating a method of implementing a life insurance option that matures as a deferred term life insurance policy according to one embodiment.

Referring to FIG. 1, according to one embodiment, a life insurance option matures later in life as a deferred term life insurance policy, which has a specified duration or expiration date. In step 100, an insured typically undergoes a medical examination. A medical examination may not be necessary in some cases, so step 100 is optional. In step 105, an insurance company (or other issuer) determines the premium to be paid during the first or inactive period and the premium to be paid during the second or active period following maturation of the life insurance policy option based on, for example, the medical examination and other information, such as age, lifestyle habits, etc. In step 110, after the life insurance option is effective, the insured pays one or more premium payments to the insurance company during the first period. The premiums can be periodic, for example, monthly, bi-annual and annual, etc. Premiums can also follow a different aperiodic schedule.

In the event of death of the insured during the first period in step 115, the insurance company pays no benefit under the life insurance policy option in step 120. Thus, the insured benefits by having comfort knowing that a life insurance policy would have matured in the future had the insured lived that long, and the insurance company benefits by receiving premiums from the policyholder during the first period without having to pay any benefit since the option did not mature.

Otherwise, in step 125, the insured is alive and continues to pay the insurance company one or more additional premiums during the first period in step 130. In step 135, the insured lives beyond the first or inactive period and into the second or active period. As a result, in step 140, the life insurance option matures into a deferred life insurance policy. The deferred life insurance policy is effective as of the beginning of the second or active period. The insured then pays the agreed upon premiums during the second period in step 145. Thus, the insured further benefits by having a life insurance policy that becomes active later in life, and the insurance company also benefits by receiving premiums from the policyholder during the first period and further premiums during the second period.

In the event of death of the insured during the second or active period in step 150, the insurance company pays a benefit to the beneficiary of the insured based on the deferred life insurance policy in step 155. Thus, the insured benefits by having the insurance company pay a benefit to the beneficiary. The insurance company's payout, however, is mitigated by the previous premium payments made during the first and/or second periods.

Otherwise, in step 160, the insured is alive and continues to pay premiums to the insurance company during the second period in step 165. In step 170, the insured outlives the second period and, as a result, in step 175, the deferred life insurance policy resulting from the matured option expires before death of the insured 180. In this case, the insured benefits from the policy by the comfort provided during the first and second periods that deferred life insurance would have been in place in the event of death of the insured during the second period. The insurance company also benefits by receiving premiums from the insured during the first and second periods and not paying a benefit since the insured outlived both the first and second periods.

Figure 2:
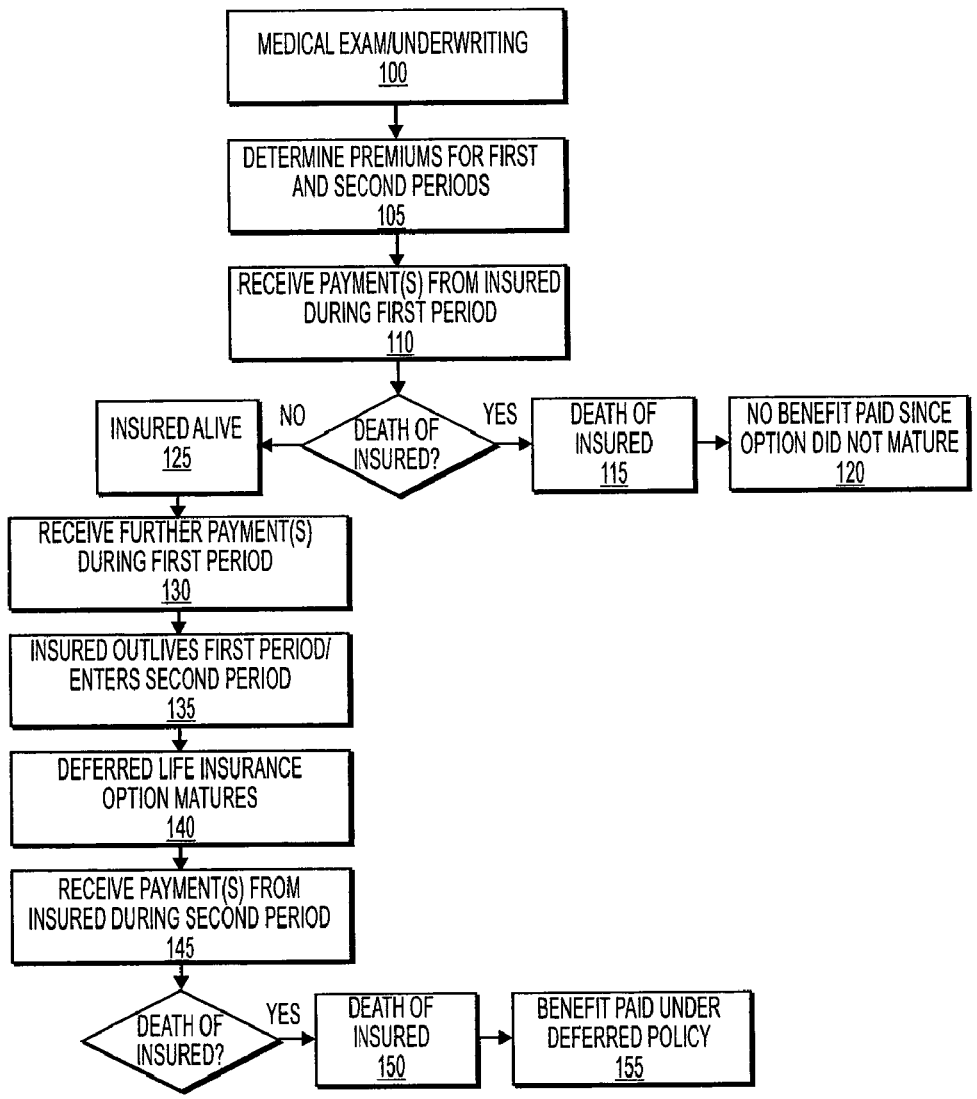
FIG. 2 is a flow chart generally illustrating a method of implementing a life insurance option that matures as a deferred whole life insurance policy according to another embodiment.

Referring to FIG. 2, according to an alternative embodiment, the second period does not have a pre-determined duration. Thus, the life insurance option matures later in life as a deferred whole life insurance policy, which expires upon the death of the insured 180 rather than at a pre-determined time. Accordingly, the insurance company pays a benefit so long as the insured lives beyond the first period so that the deferred life insurance policy matures. This embodiment includes the same steps as shown in FIG. 1 except that steps 160-180 are omitted since the second period does not have a pre-determined expiration date.

Persons skilled in the art will appreciate that all of the steps shown in FIGS. 1 and 2 may not occur during a person's lifetime. Further, certain steps may occur in a different order. For example, it is possible that no premium payments would be received during the first period in the event that the insured passes shortly after the life insurance option agreement is signed. Thus, it is possible that death of the insured during the first period can occur before or after the first premium payment during the first period, before or after the second premium payment during the first period, and so on. Accordingly, death of the insured may occur before or after step 110, and before or after step 130. Further, once the insured outlives the first period and enters the second period, it is possible that death of the insured can occur before or after step 145 and before or after step 165. Death of the insured may occur before or after the first premium payment during the second period, before or after the second premium payment during the second period, and so on. The steps and sequence thereof shown in FIG. 1 are provided for purposes of explanation and illustration, not limitation.

Figure 3:
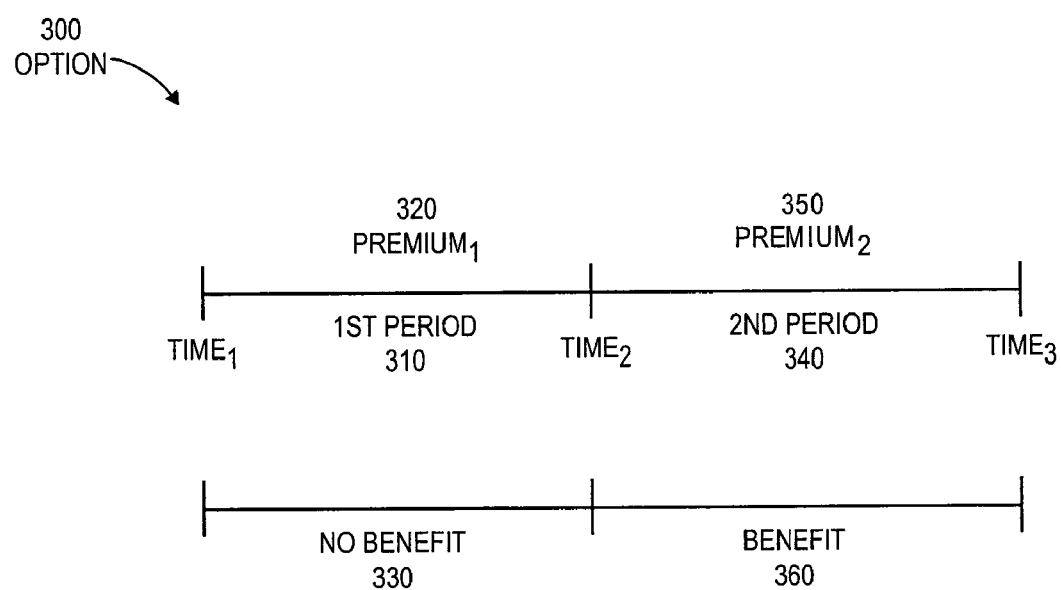
FIG. 3 is a timeline illustrating payment of premiums and benefits according to one embodiment.

FIG. 3 further illustrates when benefits are payable according to a life insurance option 300 according to one embodiment, which corresponds to the method shown in FIG. 1. In the illustrated embodiment, the policy begins at Time 1. A first period 310 is defined between Time 1 and Time 2. Beginning at Time 1, the insured pays one or more premiums (Premium 1) 320 during the first period. No benefit 330 is paid in the event of death of the insured during the first period 310 despite the payments of one or more premiums 320 during the first period 310. However, if the insured lives beyond Time 2 and into the second period 340, then the option 300 of deferred life insurance matures. The insured then pays one or more premiums (Premium 2) 350 during the second period. In the event of death of the insured during the second period 340, the insurance company pays a benefit 360. In the illustrated embodiment the second period 340 has a pre-determined duration. Thus, the insurance company is not required to pay a benefit if the policyholder outlives the second period 340, i.e., lives past Time 3.

In an alternative embodiment, the second period 340 extends for the life of the insured, as discussed above with reference to FIG. 2. Thus, the option 300 matures as a whole life policy later in life, and the insurance company is required to pay a benefit 360 upon the death of the insured regardless of whether the insured lives beyond Time 3, so long as the insured lives beyond Time 2.

Figure 4:
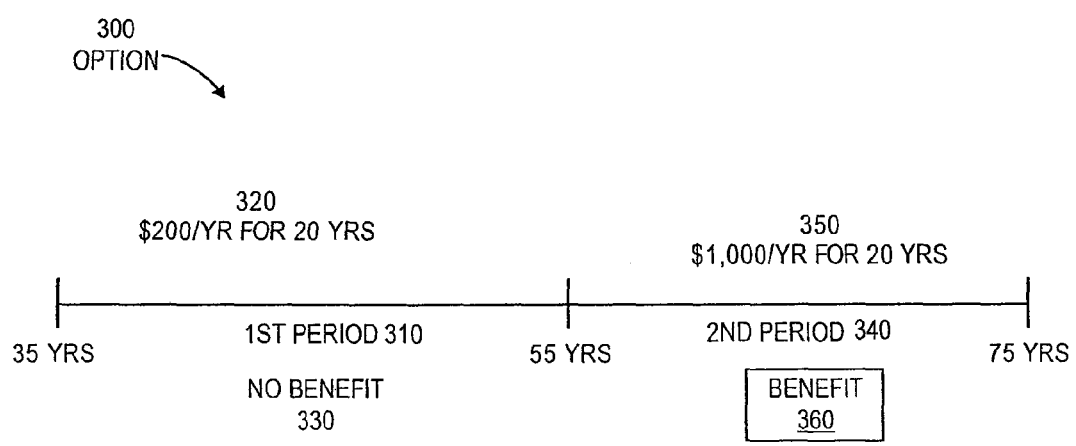
FIG. 4 is a timeline illustrating payment of premiums according to one embodiment.

Referring to FIG. 4, according to one embodiment the premiums paid by the insured can be structured to be back-loaded, i.e., higher during the second period 340. Payments may be structured in this manner, for example, if the insured does not sufficient funds to cover higher premiums early in life. This may be suitable if, for example, the insured wants to pay lower premiums for the option 300 because he or she is required to pay premiums on another life insurance policy or has other expenses during that period, e.g., housing, education, etc. The value and durations shown in FIG. 4 are provided for purposes of explanation and illustration, not limitation, since various premium values and durations of first and second periods can be utilized. According to an alternative embodiment, payments can be front-loaded, i.e., higher during the first period 310.

Figure 5:
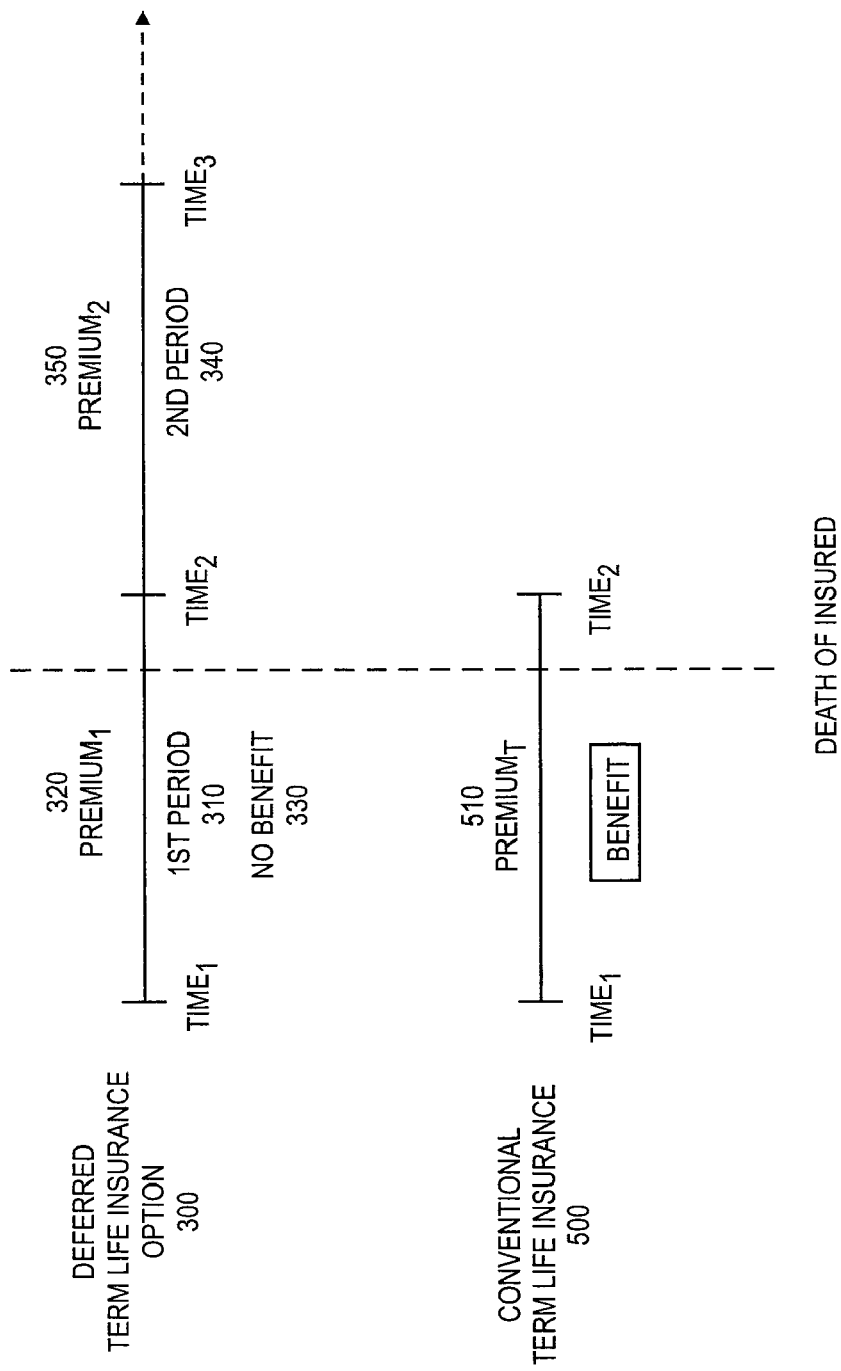
FIG. 5 is a timeline illustrating concurrent conventional term life and deferred life insurance policies in which death of the insured occurs during a first period before the deferred life insurance option matures according to one embodiment.

Referring to FIG. 5, according to one embodiment, a deferred life insurance option 300 can be used in conjunction with a conventional term life insurance. Conventional term life insurance 500 is defined as an insurance policy that provides coverage for a specified period of time (which can be based on death of the insured) and only pays a benefit in the event of death of the insured during that period of time. Conventional insurance includes known term and whole life policies.

As shown in FIG. 5, the deferred life insurance option 300 is a deferred term life insurance option that matures or becomes active upon the expiration of the conventional term life insurance policy 500. In the illustrated embodiment, the first period 310 of the deferred term life insurance option 300 is the same as the duration of the conventional term life insurance policy 500, and the second period 340 has a pre-determined duration. The insured pays premiums (Premium T) 510 for the conventional term life insurance 500 and, in addition, pays premiums (Premium 1) 320 during the first period 310 of the deferred life insurance option 300.

In an alternative embodiment, as illustrated in the dashed arrow, the second period 340 may expire with the death of the insured, thus resulting in an option for a whole life policy rather than a term policy. For purposes of explanation and illustration, not limitation, the second period 340 is shown as terminating at Time 3.

In the event of death during the first period 310 (during the conventional term policy 500), the insurance company pays a benefit only under that policy 500. Thus, the insurance company's net payments out are reduced by the incoming premiums (Premium 1) 320 for the deferred policy option 300. The insured benefits from this arrangement knowing that there would be a policy that would come into effect upon expiration of the conventional term policy 500. Thus, such a policy is mutually beneficial to policyholders and insurance companies.

Figure 6:
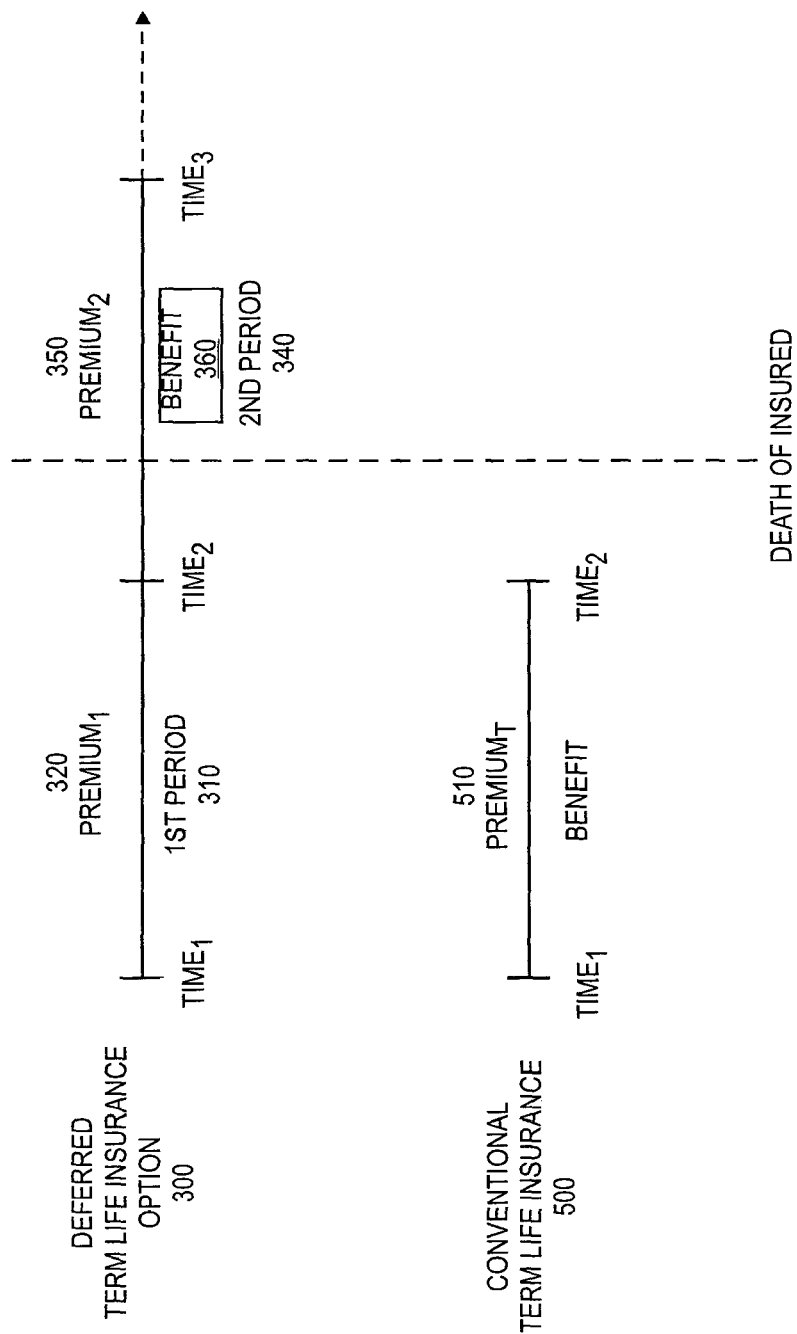
FIG. 6 is a timeline illustrating concurrent conventional term life and deferred life insurance policies in which death of the insured occurs during a second period after the deferred life insurance policy option matures according to one embodiment.

Referring to FIG. 6, death of the insured is shown as occurring during the second period 340, i.e., after expiration of the conventional term life insurance policy 500 at Time 2. In this case, the insurance company pays a benefit 340 under the deferred term life insurance policy that matured from the option 300, but not the conventional term life insurance policy 500. Thus, the insurance company receives premiums under the conventional term policy 500 without any payout, received premiums 320 and 350 during the first and second periods 310 and 340 for the deferred policy, and was then required to pay a benefit.

Figure 7:
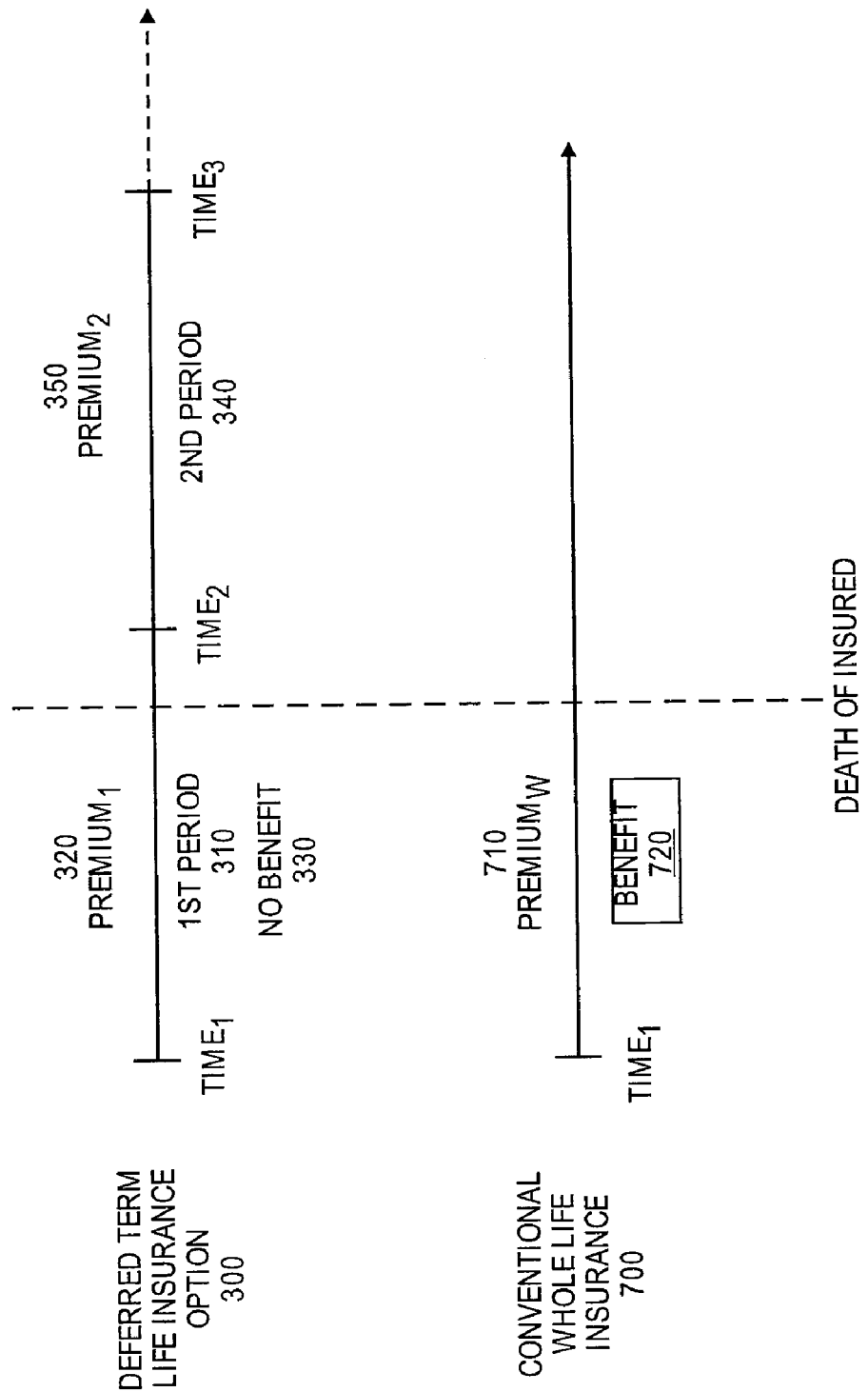
FIG. 7 is a timeline illustrating concurrent conventional whole life and deferred life insurance policies in which death of the insured occurs during a first period before the deferred life insurance policy option matures according to one embodiment.

Referring to FIG. 7, according to an alternative embodiment, the deferred life insurance option 300 can be used with a conventional whole life insurance policy 700. Conventional whole life insurance 700 is defined as a life insurance policy that provides permanent, lifelong insurance coverage, under which a benefit is paid upon the death of the insured. The insured pays premiums (Premium W) 710 for the conventional whole life insurance 700 and, in addition, pays premiums (Premium 1) 320 during the first period 310 of the deferred life insurance option 300. In an alternative embodiment, as illustrated in the dashed arrow, the second period 340 may expire with the death of the insured, thus resulting in an option for a whole life policy rather than a term policy. The insured, therefore, could be entitled to two separate whole life policies. For purposes of explanation and illustration, not limitation, the second period is shown as terminating at Time 3 and having a pre-determined expiration date In the event of death of the insured during the first period 310, the insurance company pays a benefit 720 only under the conventional whole life insurance policy 700 and not the deferred policy since the option 300 has not yet matured. Thus, the insurance company's net payments out are reduced by the incoming premiums (Premium 1) 320. The insured also benefits knowing that there would be an additional policy that would come into effect upon reaching a certain age. Thus, such a policy is mutually beneficial to policyholders and to insurance companies.

Figure 8:
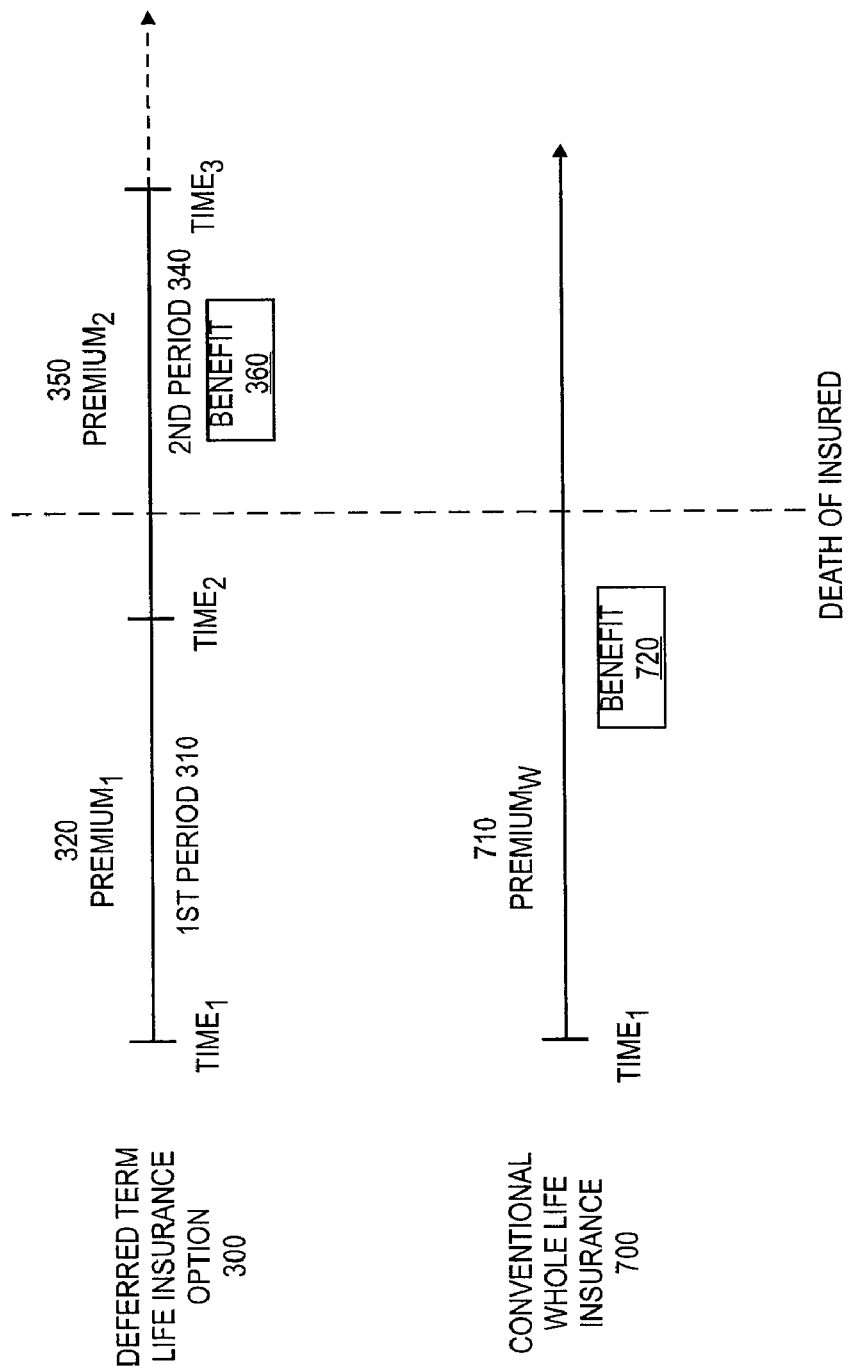
FIG. 8 is a timeline illustrating concurrent conventional whole life insurance and deferred life insurance policies in which death of the insured occurs during a second period after the deferred life insurance policy option matures according to one embodiment.

Referring to FIG. 8, in the event of death of the insured during the second period 340, the insurance company pays a benefit 720 under the conventional whole life insurance policy 700 and, in addition, pays a benefit 360 under the deferred policy since the option 300 matured.

In various embodiments described above, payments made by the policyholder can be front-loaded, or higher during the first period. Alternatively, they can be back-loaded, or higher during the second period. Thus, the dollar amount of Premium 1 320 can be greater or less than the dollar amount of Premium 2 350. For example, death of the insured may occur shortly after the second period 340 has begun, thus resulting in very few, if any, premiums 350 being paid during the second period while the beneficiary is nevertheless entitled to a benefit. Further, depending on the timing of death of the insured, the sum total of premiums 320 paid during the first period 310 can be greater or less than the sum total of premiums paid during the second period 340.

Additionally, the duration of the first and second periods 310 and 340 of the deferred policy can vary depending on the needs of the policy holder. For example, a deferred policy can be structured so that the durations of the first and second periods 310 and 340 are the same. The duration of the first period 310 can exceed the duration of the second period 340 or the duration of the second period 340 can exceed that of the first period 310. The durations of the first and second periods 310 and 340 can be, for example, between about one and forty years or other suitable durations.

Further, embodiments advantageously allow the deferred insurance policy to be based on initial medical examination, e.g., prior to Time 1, rather than a subsequent medical examination, e.g., after Time 2. Thus, the insured party is able to obtain life insurance coverage later in life (beginning at Time 2) when the option 300 matures. Such coverage would be unattainable or substantially more expensive if the same person were to attempt to obtain a separate second life insurance policy at Time 2 since the person may have health conditions that affect whether a policy could be issued and the premiums of subsequent policy, particularly with extended first periods.

Embodiments provide significant improvements over known life insurance policies by providing a safety net for policyholders that outlive their original policies rather than being left without any life insurance coverage later in life. Further, premiums can be structured to be mutually beneficial to both policyholders and to insurance companies.

It should be understood that the embodiments described herein are not limited to the particular timelines and methods disclosed, but cover all modifications, equivalents and alternatives falling within the scope of the appended claims. For example, a deferred life insurance policy or option can be used alone or in conjunction with other types of life insurance, including various types of temporary and permanent life insurance policies, including known whole, term, universal life and variable universal life insurance. Further, embodiments are not intended to be limited to only a person making one or more payments for a life insurance option for him or herself. Thus, one person may make one or more payments for a life insurance option for another person, e.g., a family member, such as a child, or another third party.

Accordingly, it will be understood that FIGS. 5-8, which illustrate examples involving conventional term and conventional whole life insurance, are not intended to be limiting and that payments for a life insurance option can be paid to the insurance/option provider for oneself or for another. Thus, references in this specification to receiving one or more payments from an insured are defined to include receiving one or more payments from an insured for the benefit of the insured and, in addition, receiving one or more payments from a person on behalf of another person who is the insured, such as a family member or other third party. Thus, the person making the payments may be a parent, guardian or agent of the insured.

Moreover, persons skilled in the art will appreciate that embodiments of the invention can be implemented within a single computer and over a network, such as the Internet. Further, software that is used to carry out or enable the steps described above can be embodied in, or readable from, a computer-readable medium or carrier, e.g., such as magnetic media, a Compact Disc (CD) and other storage media.

What is claimed:

1. A method of providing a deferred death benefit that becomes effective later in life, comprising:

processing, receiving and incorporating through a computer into a memory storage device, data from an insured, and consisting of at least one payment during a first period for an option to purchase a deferred death benefit, wherein the first period has a predetermined expiration date and wherein the insured is not entitled to the benefit in the event of death of the insured during the first period or if the death of the insured is through a predetermined exclusion, such as suicide;

a second period which follows the first period and which includes at least a second payment, the second payment being based at least partly on medical examination information of the insured obtained prior to the first period; and the benefit becomes effective at the beginning of the second period and thereby entitled the insured to the benefit only in the event of death of the insured during the second period, wherein the insured has a right, but no obligation, to continue into the second period, and wherein the second period has a pre-determined expiration date.

2. The method of claim 1, the second period having a pre-determined expiration date, wherein the option matures into a deferred term life insurance policy that is effective at the beginning of the second period.

3. The method of claim 1, the second period having an expiration date coinciding with the death of the insured, wherein the option matures into a deferred whole life insurance policy that is effective at the beginning of the second period.

4. The method of claim 1, wherein the first period is about one year to about forty years.

5. The method of claim 1, wherein the second period is about one year to about forty years.

6. The method of claim 1, wherein payments are made periodically during the first period.

7. The method of claim 1, further comprising receiving at least one payment from the insured during the second period.

8. The method of claim 7, wherein payments are made periodically during the second period.

9. The method of claim 7, wherein the sum of payments made during the first period is greater than the sum of payments made during the second period.

10. The method of claim 7, wherein the sum of payments made during the second period is greater than the sum of payments made during the first period.

11. The method of claim 7, wherein the payments made during the first period are greater than the payments made during the second period.

12. The method of claim 7, wherein the payments made during the second period are greater than the payments made during the first period.

13. The method of claim 1, further comprising receiving at least one payment from the insured during the first period for a conventional life insurance policy.

14. The method of claim 13, the conventional life insurance policy comprising a conventional term life insurance policy, further comprising receiving at least one payment from the insured during the first period for the conventional term life insurance policy.

15. The method of claim 13, wherein the conventional term life insurance policy expires at the end of the first period, and the insured is covered under the conventional term life insurance policy during the first period and covered under the deferred term life insurance policy during the second period.

16. The method of claim 15, wherein death of the insured occurs during the first period, further comprising paying a benefit under the conventional term life insurance policy but not paying a benefit under the deferred term life insurance policy.

17. The method of claim 15, wherein death of the insured occurs during the second period, further comprising paying a benefit under the deferred term life insurance policy but not paying a benefit under the conventional term life insurance policy.

18. The method of claim 13, the conventional life insurance policy comprising a conventional whole life insurance policy, further comprising receiving at least one payment from the insured during the first period for the conventional whole life insurance policy.

19. The method of claim 18, further comprising paying a benefit under the conventional whole life insurance policy but not paying a benefit under the deferred life insurance policy if death of the insured occurs during the first period.

20. The method of claim 18, further comprising paying a benefit under both the whole life insurance policy and the deferred term life insurance policy if death of the insured occurs during the second period.

21. A method of providing deferred insurance that becomes effective later in life of an insured, comprising:

processing, receiving and incorporating through a computer into a memory storage device, data consisting of at least one payment from an insured during a first period of about one year to about forty years for an option to purchase a deferred insurance policy, wherein the insured is not entitled to a benefit under the deferred insurance policy in the event of death of the insured during the first period or if the death of the insured is through a predetermined exclusion, such as suicide; and if the insured picks up the option and if the insured lives beyond the first period and into a second period of about one year to about forty years that follows the first period, the option maturing into the deferred insurance policy, the deferred insurance policy being effective at the beginning of the second period, and the computer thereby converting data, based at least partly on medical examination information of the insured obtained prior to the first period, and entitling the insured to a benefit based on the deferred insurance policy only in the event of death of the insured during the second period.

22. The method of claim 21, wherein payments are made periodically during the first period.

23. The method of claim 21, further comprising receiving at least one payment from the insured during the second period.

24. The method of claim 23, wherein payments are made periodically during the second period.

25. The method of claim 23, wherein the sum of payments made during the first period is greater than the sum of payments made during the second period.

26. The method of claim 23, wherein the sum of payments made during the second period is greater than the sum of payments made during the first period.

27. The method of claim 23, wherein the payments made during the first period are greater than the payments made during the second period.

28. The method of claim 23, wherein the payments made during the second period are greater than the payments made during the first period.

29. The method of claim 21, wherein the deferred term life insurance policy is based on medical examination information of the insured obtained prior to the first period.

30. The method of claim 21, further comprising receiving at least one payment from an insured during the first period for a conventional life insurance policy.

31. The method of claim 30, the conventional life insurance policy comprising a conventional term life insurance policy, further comprising receiving at least one payment from the insured during the first period for the conventional term life insurance policy.

32. The method of claim 30, wherein the conventional term life insurance policy expires at the end of the first period, and the insured is covered under the conventional term life insurance policy during the first period and covered under the deferred term life insurance policy during the second period.

33. The method of claim 32, wherein death of the insured occurs during the first period, further comprising paying a benefit under the conventional term life insurance policy but not paying a benefit under the deferred term life insurance policy.

34. The method of claim 32, wherein death of the insured occurs during the second period, further comprising paying a benefit under the deferred term life insurance policy but not paying a benefit under the conventional term life insurance policy.

35. The method of claim 30, the conventional life insurance policy comprising a conventional whole life insurance policy, further comprising receiving at least one payment from the insured during the first period for the conventional whole life insurance policy.

36. The method of claim 35, further comprising paying a benefit under the conventional whole life insurance policy but not paying a benefit under the deferred life insurance policy if death of the insured occurs during the first period.

37. The method of claim 35, further comprising paying a benefit under both the whole life insurance policy and the deferred term life insurance policy if death of the insured occurs during the second period.

38. An article of manufacture comprising a program storage device readable by a computer and tangibly embodying one or more programs of instructions executable by the computer; when executed perform method steps for providing a deferred death benefit that becomes effective later in life, the method comprising the steps of:

receiving at least one payment from an insured during a first period for an option to purchase a deferred death benefit, wherein the insured is not entitled to a benefit in the event of death of the insured during the first period or if the death of the insured is through a predetermined exclusion, such as suicide; and if the insured lives beyond the first period and into a second period that follows the first period, the option maturing into the deferred death benefit, the benefit being effective at the beginning of the second period, and the insured being entitled to a benefit only in the event of death of the insured during the second period.

* * * * *

UNITED STATES PATENT AND TRADEMARK OFFICE
CERTIFICATE OF CORRECTION

| | | |
|---|---|---|
| PATENT NO. | : 7,797,174 B2 | Page 1 of 1 |
| APPLICATION NO. | : 11/256320 | |
| DATED | : September 14, 2010 | |
| INVENTOR(S) | : Jonathan H. Samuels | |

It is certified that error appears in the above-identified patent and that said Letters Patent is hereby corrected as shown below:

Title page, item [73] Assignee should be deleted

Signed and Sealed this

Twenty-sixth Day of October, 2010

David J. Kappos
*Director of the United States Patent and Trademark Office*